Sept. 29, 1953  J. J. KUPKA  2,653,448
HEATED PRESSURE AIR-DRIVEN POWER PLANT
Filed May 18, 1949  4 Sheets-Sheet 1

INVENTOR.
John J. Kupka
BY
F. Kumpf
ATTORNEY

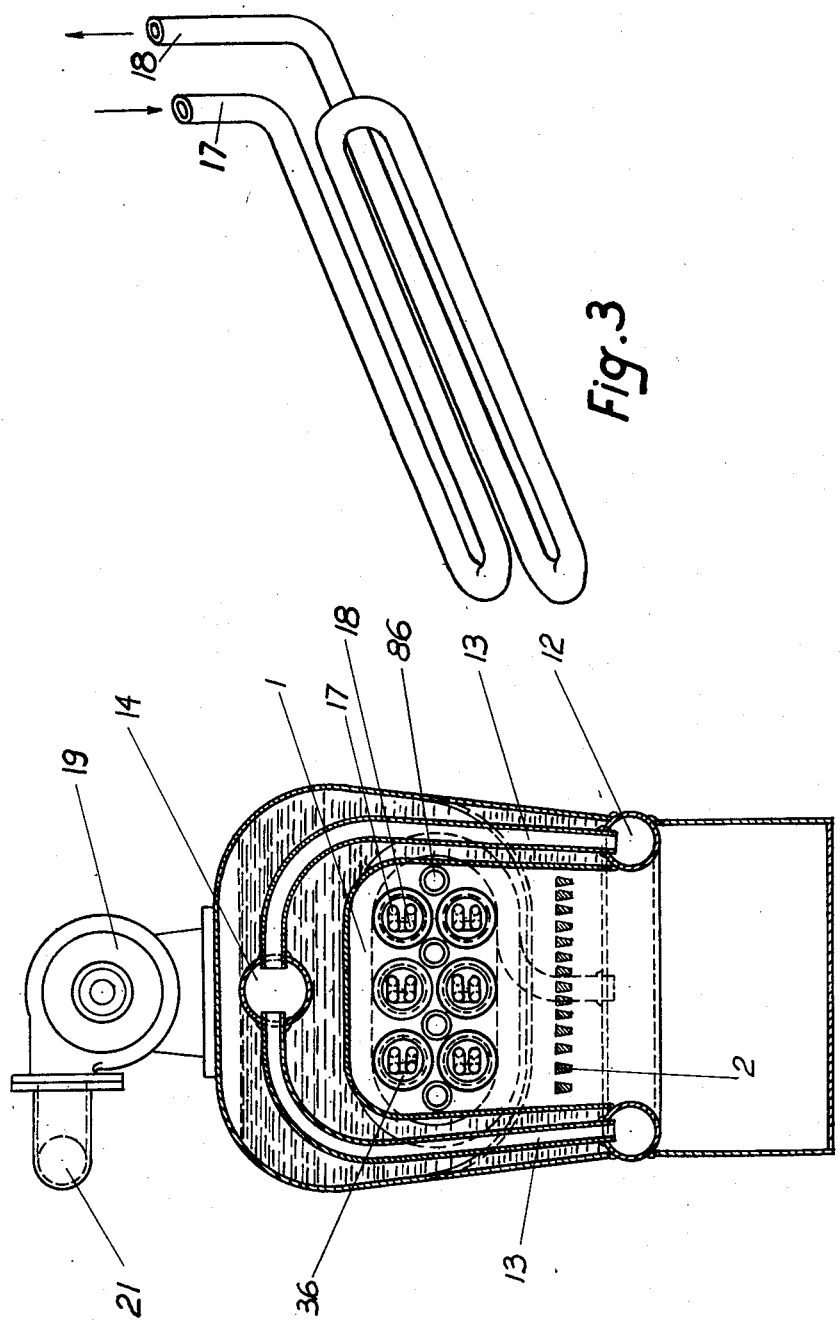

Sept. 29, 1953  J. J. KUPKA  2,653,448
HEATED PRESSURE AIR-DRIVEN POWER PLANT
Filed May 18, 1949  4 Sheets-Sheet 3
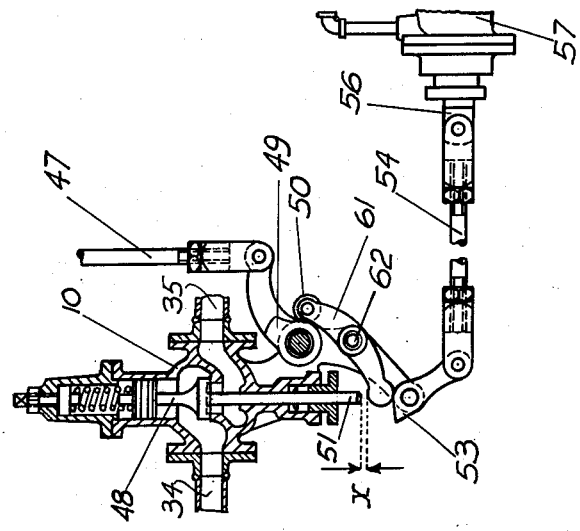
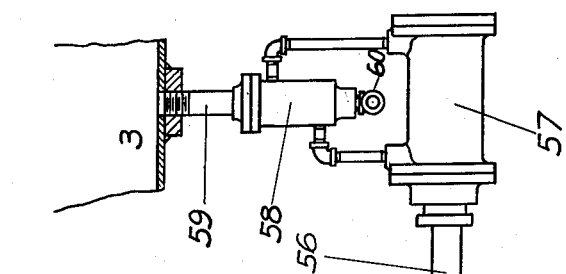
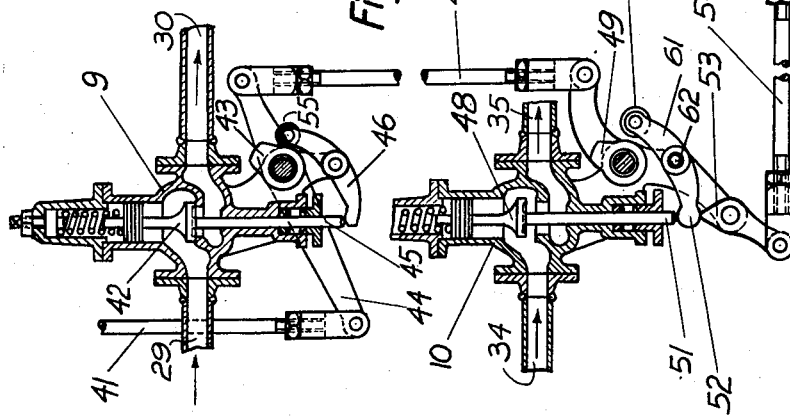
INVENTOR.
John J. Kupka
BY
F. Kumpf
ATTORNEY

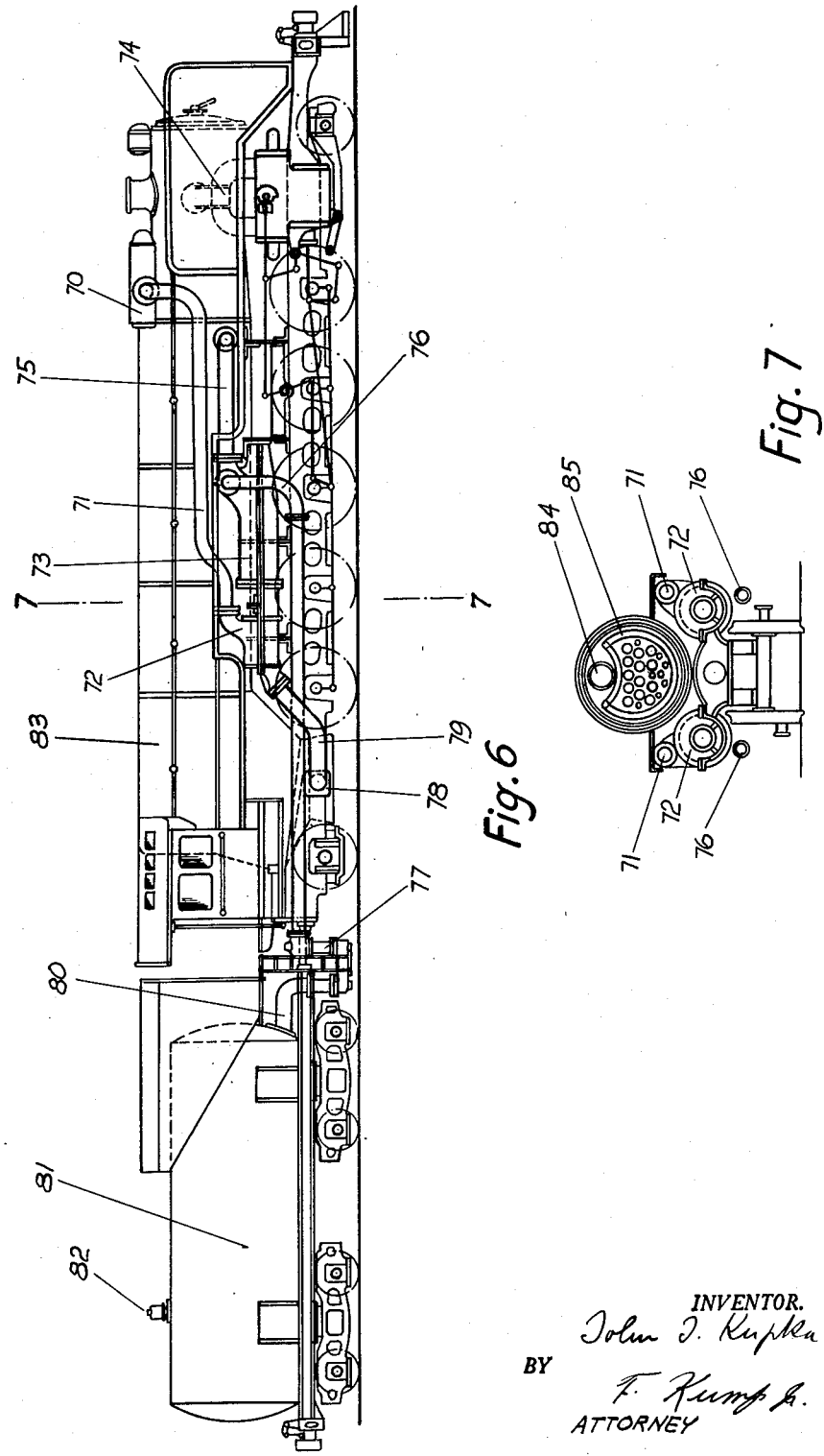

Patented Sept. 29, 1953

2,653,448

UNITED STATES PATENT OFFICE 2,653,448

HEATED PRESSURE AIR-DRIVEN POWER PLANT

John J. Kupka, Gladstone, N. J.

Application May 18, 1949, Serial No. 93,949

2 Claims. (Cl. 60—59)

The present invention relates to fluid driven mobile or stationary power plants, in which the pressure fluid is heated air. More particularly it relates to power plants, which are subject to restrictions of space and weight, such as locomotives or propelling machinery for ships. Such power plants are subject to operational variations in the demand for power which in the case of locomotives, occur frequently at short intervals.

In power plants of the character described, fuel economy often dictates the use of internal combustion engines, like the diesel type for instance, which has important operational advantages over a steam driven variety. It does not require a boiler, with its attendant maintenance problems and in the case of locomotives, there is no need to carry huge quantities of boiler feed water in a separate tender, which constitutes a handicap in the operation over long distances, due to the necessity of intermittent stops to replenish its contents. The available water supply is also very often of a composition which engenders scale deposits and priming within the boilers and thus additional expenses of operation are incurred, which react most unfavorably against the steam driven locomotive in comparison with the diesel locomotive. From the fuel cost angle, steam, when used as a source of pressure fluid in noncondensing types of steam power, is also handicapped by the large amount of waste heat thrown into the atmosphere by exhausting steam which has a very high latent heat of evaporation, in comparison with the amount of heat which can be converted into useful work.

It has been proposed in the past to use air as a pressure fluid in stationary power plants but due to the variations in the power demand in mobile plants such as marine or locomotive engines, no satisfactory solution of the operational problems has been found. Accordingly one of the purposes of the present invention is the novel feature of an inter-position between the source of heat for operation of power plants of the character described and the power generator, of a heat storage accumulator, which is capable of absorbing any excess heat produced at the combustion center over the heat demand of the power generator. Likewise, in instances where the heat produced in the combustion center can not keep pace with the momentary demand made by the operation of the power plant, such heat storage accumulator can boost the deficient heat release to prevent stalling of the power generator. In other words, according to this new invention, the creation of a thermodynamic flywheel effect, to take care of a fluctuating power demand is intended to prevent a frequently observed stalling of the power generator in power plants which use heated air as a pressure fluid.

Another purpose of this invention is the provision of novel means to effect heat transfer within the heat storage accumulator from the combustion center to the circulating air, in successive stages which ensure an adequate temperature differential, between the heat transferring media and the aforesaid circulating air, which enters into the said heat storage accumulator under a pre-determined pressure.

A further purpose of the present invention is the provision of a heat storage accumulator, which is compact in its construction and easy to maintain with the additional feature of integration within the supporting structure for a mobile power plant of the contemplated character, particularly in the case of a hot air operated locomotive engine. Still another purpose of the present invention is low cost application to already existing marine or locomotive engines of the novel heat storage accumulator in conjunction with built-in air compressors and drives for such.

Finally, in the case of application of the said invention to power plants in which it is desirable to provide a heating system using hot air as heating medium, the hot exhaust from the power generator may be conveniently used for that purpose. This is especially useful in marine installations as an almost complete recovery of the heat released in the combustion center of the power plant is possible.

Features of the invention

In effectuating the aforesaid general purposes, the invention contemplates a combustion center adapted to burn coal, oil or wood, in which the heat release takes place at atmospheric pressure. An induced draft system is proposed, which may be conveniently operated by the exhaust from the power generator, in a manner very similar to conventional steam locomotive practice. The power generator itself can be of the reciprocating pressure fluid engine type or a turbine, which exhausts into the nozzle of the induced draft apparatus in order to expel the combustion gases into the atmosphere. In order to effectively use air as a pressure fluid in the said power generator, advantage is taken of the well known fact, that compressed air, when heated at constant pressure, increases its volume considerably, in proportion with the increase in its absolute temperature. Thus the volume of air at 225 p. s. i., gauge pressure when heated from 150 deg. F. to 850 deg. F. can be almost doubled and this feature offers a most valuable means to convert heat energy into work. Since air offers considerable difficulties in the way of effective heat transfer by contrast with di-atomic pressure fluids, such as steam for instance, the raising of temperature from 150 deg. F. to 850 deg. F. requires special attention in the selection of heat transfer elements. Due to the high combustion temperature of the fuel, direct contact of the compressed air, with the walls which surround the combustion center is impracticable. Oxidation and danger of burnt-out metal walls in cases of rapidly fluctuating amounts of circulated air are the main obstacles. According to the new invention, the center of combustion is surrounded by a heat absorbing medium, of high thermal storage capacity which is under substantially atmospheric pressure. Dowtherm or similar derivatives may be used, because they are stable and have a relatively high boiling point under atmospheric pressure. Thus ordinary carbon-steel plates may be used for the construction of the combustion center and the adjacent heat storage accumulator, which also serves as a heat exchanger.

A compressor of high capacity, preferably of the multistage rotary type, delivers air at a predetermined pressure, into a primary pipe coil system, located within the aforesaid heat storage accumulator. This primary pipe coil system is completely submerged at all times by the hot fluid of said accumulator, which is heated by contact with the walls of the combustion center and the flues which carry the hot combustion gases from the grate to the draft chamber and thence to the atmosphere. After passing through this primary pipe coil system, which limits the temperature differential between the inner and outer walls to the limit set by the boiling point under atmospheric pressure of the fluid within said heat storage accumulator, the compressed air passes through a secondary piping, which consists of a series of small diameter elements, housed within a certain number of flues of the heat storage accumulator. These flues, which conduct into the draft chamber the hot combustion gases of the burnt fuel, permit an additional increase in the temperature of the compressed air, which is governed by the temperature differential of the fluid within the heat storage accumulator and the flue gases passing from the combustion center into the draft chamber. Suitable means can be provided within the aforesaid secondary piping to create a turbulence effect of the passing air, in order to improve the heat transfer.

According to a further feature of the contemplated invention, the aforesaid compressor delivers relatively cold air into an air storage tank of large capacity, which is equipped with a pressure relief valve in order to maintain a predetermined compressor discharge pressure. From said air storage tank, which creates a pressure equalizer, to prevent rapid changes in air pressure within the primary and secondary pipe coil systems within the heat storage accumulator when the demands from the power generator are subject to sudden fluctuations, the flow of the compressed air is regulated through a throttle, which is preferably hand controlled. This permits an easy control of the output of the power generator, thanks to certain novel and special features of this throttle. The very considerable power required to operate the previously mentioned compressor is supplied from a hot air driven turbine, which is directly connected to the said compressor. In order to prevent stalling of the whole turbo-compressor unit, when the power generator is idle, the previously mentioned throttle is equipped with means which permit a complete shut-off in the circuit leading to the power generator, while maintaining at the same time an adequate flow of compressed hot air to the turbine which drives the compressor. This feature not only assures an adequate cooling action within the heat storage accumulator and its associated primary and secondary pipe coils, but also prevents the Dowtherm or any other fluid within the said unit from overboiling. Should this cooling action be of sufficient magnitude to cause the fluid within the heat storage accumulator to become too cold for good operating conditions, an optional thermostatic shut-off may be provided, which brings the turbo-compressor unit to a stop. It should be clearly understood, that with the power generator being idle the circulating compressed air is exhausted into the atmosphere through an automatic unloading valve, which becomes operative as soon as the hot air supply to the power generator is shut off. In cases where it is found desirable to make use of the relatively hot air exhausted from the turbine, which operates the rotary compressor aforementioned, a system of ducts can be connected to the turbine exhaust passages. The exhaust from the power generator, however, be it of the turbine type or reciprocating engine type, is mixed with the combustion products through its passage through the draft chamber and is therefore not suitable for a hot air circulation heating system. A calculation of the quantities of heated air needed to operate the contemplated power plant will reveal, that only a fraction of the rated output of the hot air turbine, which operates the rotary compressor will be available to produce useful work in the power generator. This condition is somewhat analogous with gas turbine practice and it is specifically mentioned that the contemplated power plant will not equal the thermal efficiencies of gas turbines. However, in certain instances, where it is desired to use low grade coal, having a high ash content for power generation purposes, the complicated and expensive devices needed to keep fly-ash out of the power generator make gas turbines impractical. The contemplated invention, by contrast with steam power plants not only offers a substantial lowering of the heat consumption per power unit developed in the power generator, but also dispenses altogether with a steam boiler and its firing system, adapted to use low grade-high ash content coal. Moreover, the combination of such a power plant with a reciprocating type of power generator, in the case of locomotive or marine engines, eliminates the electrical power transmission, which is compulsory with gas turbines. By restricting the maximum operating temperature of the heated air to the limits determined by adequate piston lubrication, with optional jacketing of the associated power cylinders for piston cooling purposes, the direct acting reciprocating type of power generator offers definite operational advantages over the electric power transmission. It will not cause burnt-out traction motors in case of overloading, with the costly repairs required in such instances. Moreover, it is possible to convert a good many existing steam locomotives or reciprocating steam marine engines to use hot air in accordance with the features of this new invention. The continued possibility to use coal instead of oil, which may be needed for strategic purposes, is a matter of primary military importance, especially in view of the growing demand for low sulphur-content diesel oil. How the aforesaid advantages and objects are secured, together with others, which may be incident to the said invention, will be seen in the accompanying description with appended reference drawings.

*Description of reference drawings*

Fig. 1 constitutes a diagrammatic view of a power plant constructed in accordance with the features of the present invention.

Fig. 2 constitutes a cross section following line 2—2 of Fig. 1 showing the spacing of the elements of the secondary piping for the circulating air within the flues which conduct the combustion gases through the flues into the draft chamber.

Fig. 3 depicts in diagrammatic form the construction of the elements of the secondary piping aforementioned, which creates an exchange of heat between the combustion gases and the circulating air.

Fig. 4 shows in detail a typical construction of the throttle valve for the power generator with automatic idling control connection in the "on" position.

Fig. 5 shows the same mechanism with automatic idling control in the "off" position.

Fig. 6 shows in side elevation the application of the invention to a 2—10—2 type 2 cylinder reciprocating locomotive adapted to burn coal.

Fig. 7 shows a cross section following line 7—7 on Fig. 6 of such locomotive.

*Description of the invention*

Figure 1:
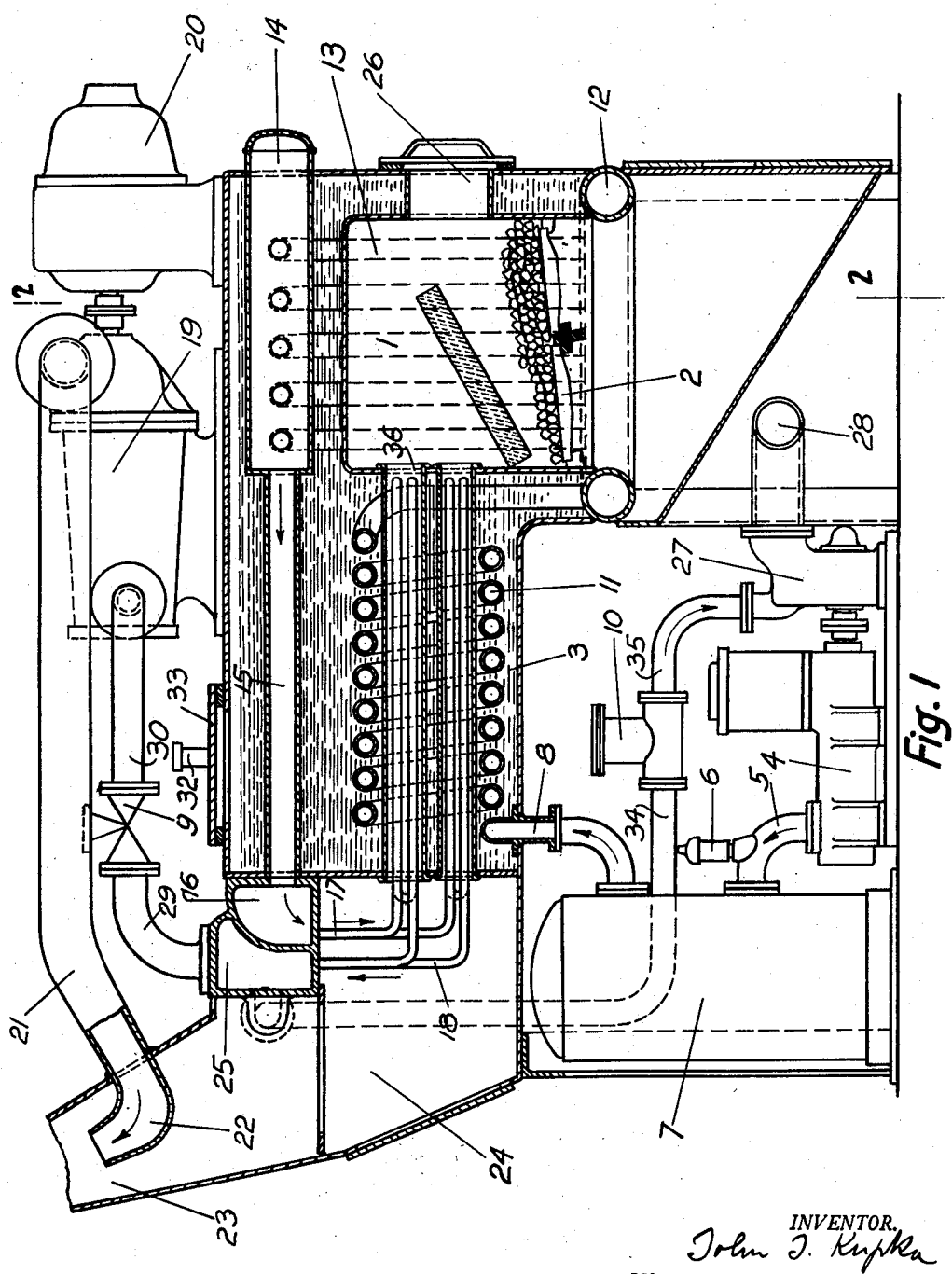

By referring to Fig. 1, it will be noted that the combustion center 1 is provided with a grate 2, which is adapted to burn coal. It can be hand-fired, as shown in the preferred embodiment of the said invention as shown in Fig. 1, or it can be adapted for mechanical firing. A travelling grate for instance is perfectly suitable for this purpose. Combustion is maintained at substantially atmospheric pressure and the air is drawn through the underside of the grate 2, through a partial vacuum created in the draft chamber 24 by the nozzle action of blast pipe 22 which receives its supply of expanded air through duct 21, which connects with the exhaust of the power generator 19. In the preferred embodiment of this invention according to Fig. 1 the power generator 19 shown is a hot air driven turbine. It is to be clearly understood, that a reciprocating type of piston engine may be used equally well for certain purposes. The heat storage accumulator 3 is very similar in its construction to a steam boiler of the locomotive type, with this important difference, that it does not carry any pressure at all and a vent 32 is provided, to ensure atmospheric pressure within said element of the power plant. The walls of the combustion center are not subjected to any pressure, other than the static pressure of the fluid, which is used as a heat transfer medium between the heated walls of the combustion center and the heat absorbing surface of the primary coil 11, which is internally cooled by the circulating air. The combustion center 1 is also provided with an air receiver 12 in its lower portion, which is shown more clearly by Fig. 2. The primary coil 11 communicates with said receiver 12 and a number of tubes 13 connects said receiver with a collector 14, which in turn is part of the secondary piping elements. The heat storage accumulator 3 is filled with Dowtherm or similar high boiling point compounds, which remain stable for a long time. Collector 14 is connected with a header, which may be conveniently located within the draft chamber 24. This header consists of two separate chambers 16 and 25. Chamber 16 may be conveniently termed the low temperature chamber and 25 may be termed the high temperature chamber. The low temperature chamber 16 carries a number of outlets which communicate with tubular elements 17, contained within the flues 36. After circulating the air through elements 17, which create an additional means of heat exchange between the hot combustion gases and the passing air, the high temperature chamber 25 receives outlet orifices 18 of said elements 17, in order to collect the substantially increased volume of the heated air. Throttle valve 9 regulates the supply of hot high pressure air to the power generator 19, which is delivered through pipe 29.

Mention has been made in the preamble of a special feature of this invention, which is incorporated with the throttle valve 9. With this throttle valve in the wide open position, a mechanical, electrical pneumatic, or hydraulic means assures a wide open position of throttle valve 10, which establishes communication between the high temperature chamber 25 of the header through pipe 34 to the hot air turbine 27 which drives the compressor 4 and thus delivers a large volume of cold circulating air into the power circuit. As is shown by Fig. 4, the aforesaid means of interconnecting throttle valve 9 with throttle valve 10 incorporate a movable stop 53 within the housing for 10 which is engaged by an air cylinder 57. When the temperature of the circulating air in high-temperature chamber 25 of the header is above a predetermined limit, the movable stop 53 prevents a complete closure of throttle 10 even if throttle 9 is shut. This feature ensures an adequate volume of air passing through the circuit, in order to prevent a burning out of the elements 17, which are made of inconel, stainless steel or other metal which is impervious to oxidation at elevated temperatures. The moment the temperature is below the limit set by the adjustment of thermostat 58, the stop 53 is disengaged and thus the throttle 10 is completely shut off and no air passes through the circuits. Thus an excessive cooling of the Dowtherm contained within the heat storage accumulator is avoided, during periods of restricted heat release in the combustion center 1.

In the depicted embodiment of the invention, in accordance with Fig. 4 and Fig. 5, both throttles 9 and 10 are of the balanced single seat poppet valve type, with spring controlled return stroke. Hot high pressure air is admitted through pipes 29 and 34 respectively into said interconnected throttles. Pipes 30 and 35 respectively admit the pressure fluid into the power generator 19 and the turbine 27, as shown in Fig. 1. The valve bodies 42 and 48 are actuated by valve spindles 45 and 51 respectively, which in turn are engaged by levers 46 and 61. The power generator 19 is controlled by throttle rod 41 which permits either a manual or automatic control. The double armed lever 44 is fulcrumed in cam 43, which transmits the required amount of throttle control movement through roller 55 to lever 46. Simultaneously with the movement of double armed lever 44, cam 49 of throttle 10 is engaged through rod 47. Roller 50 which is carried by double armed lever 61 swinging round fulcrum 62 is clear of cam 49 when the throttle 9 is closed. Throttle 10 is open, in order to ensure an adequate air circulation through the heat exchanger pipe coils, as long as the extension 52 of lever 61 is engaged by stop 53. Disengagement of stop 53 through the action of the thermostat 58, which communicates with the fluid of the heat storage accumulator 3 through pipe connection 59, makes double armed lever 61 swing round its fulcrum 62, until the roller 50 is in contact with cam 49. In this position there is a clearance "x" between the bottom of valve spindle 51 and lever end 52, so as to ensure a seating of throttle 10, which stops turbine 27 and compressor 4.

The air cylinder 57 receives its air supply through orifice 60 which distributes the air alternatively to one or the other of the two extreme positions of the piston which is carried by rod 56. Rod 54 connects said air cylinder to stop 53 in order to engage or disengage double armed lever 61 with the valve spindle 51.

In the event of a sudden closure of power generator throttle 9, there is a possibility that the still running compressor 4 driven through turbine 27 delivers an excessive amount of compressed air into storage tank 7. An unloader 6 is incorporated in pipe connection 5 between the compressor 4 and storage tank 7 in order to provide a release into the atmosphere of said excess air supply. The hot exhaust air from turbine 27 may be carried through duct 28 into the atmosphere or if desired into heating ducts for a building or ship.

In considering the application of the principles of the new invention to a locomotive, Fig. 6 and Fig. 7 will show how same can be integrated within an existing type of a 2-cylinder heavy freight engine.

The heat storage accumulator 83 follows generally speaking the pattern disclosed by Fig. 1. The primary pipe coil system 85 corresponds to 11 of Fig. 1. Collector 84 shown in Fig. 7 corresponds to 14 of Fig. 1. The throttles 9 and 10 of Fig. 1 are enclosed in a housing 70 of Fig. 6. In order to cope with the heavy duties of a locomotive engine the turbo driven compressor set of Fig. 1 is arranged in duplex arrangement and one of such sets is located on each side of the heat storage accumulator 83, as shown by Fig. 3. Hot air turbines 72 which receive the pressure fluid through pipes 71 correspond to turbine 27 of Fig. 1. Turbo compressors 73 of Fig. 6 correspond to part 4 of Fig. 1. Pipes 75 feed cool compressed air into the primary pipe coil systems 85 in the manner disclosed by Fig. 1. Pipes 76 connect through flexible pipe joints 77 and connecting elbow 80 to air storage tank 81 which is provided with unloader 82, which corresponds to 6 of Fig. 1.

Branch pipes 74 are functionally analogous to pipe 33 of Fig. 1. To ensure adequate heating surface of the heat storage accumulator additional small diameter flues 86 as shown by Fig. 2 are also provided in the locomotive engine. Furthermore as an added measure of a fuel saving character the comparatively warm air which is exhausted from turbines 72 may be carried by ducts 79 and opening 78 of Fig. 6 to the underside of the grate of the combustion center of heat storage accumulator 83. This would correspond to a combustion air pre-heater. A poppet valve gear is also proposed on the jacketed power cylinder to overcome lubrication problems.

It is to be understood that the aforesaid improvements are capable of extended application and are not confined to the exact showing of the drawings nor to the precise construction described and, therefore, such changes and modifications may be made therein as do not affect the spirit of the invention nor exceed the scope thereof as expressed in the appended claims.

I claim:

1. In a combination hot air operated heating and power plant, a fired vessel, a heat transfer medium within said fired vessel, a means to keep the pressure of said heat transfer medium at a selected magnitude, a means to keep the temperature of said heat transfer medium within selectively pre-determined limits, an air compressor and a driving means therefor, a means to augment the heat content of the pressure air delivered by said air compressor from the heat stored and generated within aforesaid fired vessel.

2. In a combination hot air operated power and heating plant, a fired vessel, a liquid heat transfer medium therein, a means to keep the pressure of said liquid heat transfer medium substantially at atmospheric pressure, an air compressor, a heated pressure air operated driving means therefor, a means to augment the heat content of the pressure air delivered by said air compressor from the heat stored and generated within aforesaid fired vessel, a power generating means driven by a portion of the pressure air delivered by aforesaid compressor, a means to keep the temperature of liquid heat transfer medium of the aforesaid fired vessel within selectively pre-determined limits, a power generating means driven by the remaining portion of the pressure air delivered by aforesaid air compressor and ducts for delivering the hot air expelled from the said compressor driving means into a heating system.

JOHN J. KUPKA.

References Cited in the file of this patent

UNITED STATES PATENTS

| Number | Name | Date |
| --- | --- | --- |
| 732,892 | Pratt | July 7, 1903 |
| 990,231 | Crocker | Apr. 25, 1911 |
| 1,001,703 | Stucki | Aug. 29, 1911 |
| 1,753,190 | Andrews | Apr. 8, 1930 |
| 2,135,547 | Warr | Nov. 8, 1938 |
| 2,298,625 | Larrecq | Oct. 13, 1942 |
| 2,354,932 | Walker et al. | Aug. 1, 1944 |
| 2,421,387 | Lysholm | June 3, 1947 |
| 2,438,834 | Wartes | Mar. 30, 1948 |

FOREIGN PATENTS

| Number | Country | Date |
| --- | --- | --- |
| 21 | Great Britain | Jan. 2, 1857 |
| 19,054 | Great Britain | Oct. 24, 1892 |